United States Patent [19]

Kamezaki et al.

[11] Patent Number: 4,985,289
[45] Date of Patent: Jan. 15, 1991

[54] OPTICAL DATA RECORDING MEDIUM

[75] Inventors: Hisamitsu Kamezaki, Ibaraki; Yoshitane Tuburaya, Toride, both of Japan

[73] Assignee: Hitachi Maxell, Ltd., Osaka, Japan

[21] Appl. No.: 351,087

[22] Filed: May 12, 1989

[30] Foreign Application Priority Data

May 14, 1988 [JP] Japan .................. 63-115979

[51] Int. Cl.⁵ .................................. B32B 3/02
[52] U.S. Cl. .......................... 428/64; 428/65;
428/913; 430/945; 369/284; 369/288; 346/766;
346/135.1
[58] Field of Search .............. 428/64, 65, 913;
430/945; 369/284, 288; 346/766, 135.1

[56] References Cited

U.S. PATENT DOCUMENTS

| 4,492,718 | 1/1985 | Mayer et al. | 427/54.1 |
| 4,522,846 | 6/1985 | Mayer et al. | 430/321 |
| 4,584,259 | 4/1986 | Mayer et al. | 428/64 |
| 4,616,238 | 10/1986 | Tani et al. | 369/284 |

Primary Examiner—Patrick J. Ryan
Attorney, Agent, or Firm—Birch, Stewart, Kolasch & Birch

[57] ABSTRACT

A write-once type filled up with any fillers optical data recording medium provided with recording layers for a melting and diffusion recording system is disclosed, wherein a protective layer is formed between the recording layers or between the recording layer and another plate shaped member, the protective layer being composed of a member which is not adversely effected by a melting and recording operation and is not warped by changes of external conditions.

13 Claims, 4 Drawing Sheets

OPTICAL DATA RECORDING MEDIUM

BACKGROUND OF THE INVENTION

1. Field of the Invention

The present invention relates to a write-once type optical data recording medium filled up with suitable fillers, having a recording layer suitable for a melting and diffusion recording system.

2. Description of the Related Art

Conventionally, there is known an optical data recording medium (recording single-plate) comprising a substrate including a predetermined irregular signal pattern, and a recording layer formed thereon composed of a recording material for a melting and diffusion recording system. Data is written on the optical data recording medium by causing a thermal deformation such by melting, diffusion and the like of the recording layer by irradiating a highly concentrated beam, e.g., a laser beam, on the recording film thereof. This type of optical data recording medium often has an air sandwich structure, wherein two recording single-plates, each having a recording layer are bonded through an air layer with the respective recording layers facing inward. Note that the same structure may be used when a protective plate-shaped member having substantially the same shape and size as the recording single-plate, but not provided with a signal pattern, and a recording layer is bonded on the side of the recording layer of a recording single-plate.

This air sandwich structure is roughly classified into a sealed type wherein the air layer is sealed and a venting type wherein the air layer is communicated with the outside air, and each type includes a reinforcement type wherein two recording single-plates have a reinforcing plate held therebetween or a single-plate and a plate shaped member have a reinforcing plate held therebetween, and a cover glass type wherein the outer periphery of a recording medium having signal patterns formed on both front and back surfaces thereof is covered a cover glass through an air layer, and the like, depending on the combination of members used for forming the air layer.

The optical data recording medium having the former sealed type air sandwich structure, however, has serious drawbacks in that the recording single-plate and other plate shaped member become warped and thus a normal record reproducing operation becomes impossible, and in the worst case, and a crack will be generated in the substrate or the recording layer or a bonded portion is peeled off because the pressure in the air layer is greatly varied by changes in the weather conditions, such as temperature, atmospheric pressure and the like.

On the other hand, the above problems do not occur in the optical data recording medium having the venting type air sandwich structure because the pressure in the air layer is always equal to the outside air pressure, but this structure has problems in that the recording layer is easily corroded and the life of the medium is shortened because foreign substances, such as water and dust, are easily deposited on the recording layer.

As shown, for example, in Japanese Patent Publications Nos. 57-66540 and 57-130243, an improved bonding type optical data recording medium is known wherein a protective layer, including an adhesive for binding, is disposed on a recording layer, and two substrates are bonded with the protective layer held therebetween.

This optical data recording medium, however, has a problem in that, when the recording layer of the recording medium is used as a recording layer for a melting and diffusion system and a recording is effected by forming pits in the recording layer by heat-melting the layer, satisfactory pits cannot be formed. More specifically, while the heat transfer coefficient of the protective layer including the adhesive must be low enough and the protective layer must be wet resistant to the molten body of the heat-melted recording layer, as far as possible, the above protective layer has a problem in that it has a strong close adhesion force (good wetting property) to the recording layer, and thus the molten recording material will not diffuse well, the formation of satisfactory pits is prevented, and the sensitivity is greatly reduced. As a result, this optical data recording medium cannot be practically used.

SUMMARY OF THE INVENTION

Taking the above into consideration, an object of the present invention is to provide an optical data recording medium capable of forming satisfactory pits in a recording layer of a melting and diffusion system in a type of optical recording medium filled up with fillers, having an excellent durability, not using an air sandwich structure.

To achieve the above object, according to the present invention, there is provided a closely adhered type optical data recording medium comprising at least one recording single-plate having a recording layer for a melting and diffusion recording system, a second plate shaped member integrally bonded to the recording single-plate, with the recording layer of the medium facing inward, and a protective layer interposed between the recording layer and the second plate shaped member, layered to the recording layer, the protective layer being composed of a material having a low heat transfer coefficient and being wet resistant.

In this case, it is possible to bond together two recording single-plates each having the above recording layer to make a medium to be recorded on both sides thereof or to integrally bond a plate-shaped member, such as a protective plate or the like, to the side of the recording layer of the recording single-plate to constitute an optical recording medium to be recorded on one side thereof.

In addition, an arrangement can be used such that a reinforcing plate is interposed between the two recording layers of two recording single-plates or the outer periphery of a substrate is covered by a cover glass over the side of the substrate on which a recording layer is formed facing inward i.e. facing to the cover glass, if desired.

DESCRIPTION OF THE PREFERRED EMBODIMENTS

As described above, since an optical data recording medium according to the present invention is a closely adhering type, water, dust and the like cannot deposit on its recording layer and its recording single-plate will not warp by changes in the atmospheric pressure, and thus the durability of the recording medium is ensured.

A porous member and a material with a low surface energy and a large tangent angle are used as a protective layer, and both may be used in combination.

The porous member is composed of an any porous material of, for example, a porous ethylene fluoride resin, or a porous metal and the like, which is flexible enough not to damage the above recording layer. The porous member is integrally formed on the recording layer as a protective layer or is layered over a protective layer.

In the case of being layered on the recording layer, the average pore diameter, porosity and thickness of the porous member are determined by taking into consideration the amount of gases discharged from the recording layer a recording operation. For example, when a organic pigment type of heat mode recording material wherein a volume reducing ratio of a recording area (a beam irradiated area) of 20–30% is used, a porous member having an average pore diameter of 0.03 $\mu$m–0.30 $\mu$m, a porosity of 40%–73%, and a thickness of 100 $\mu$m–150 $\mu$m is used.

Figure 2:
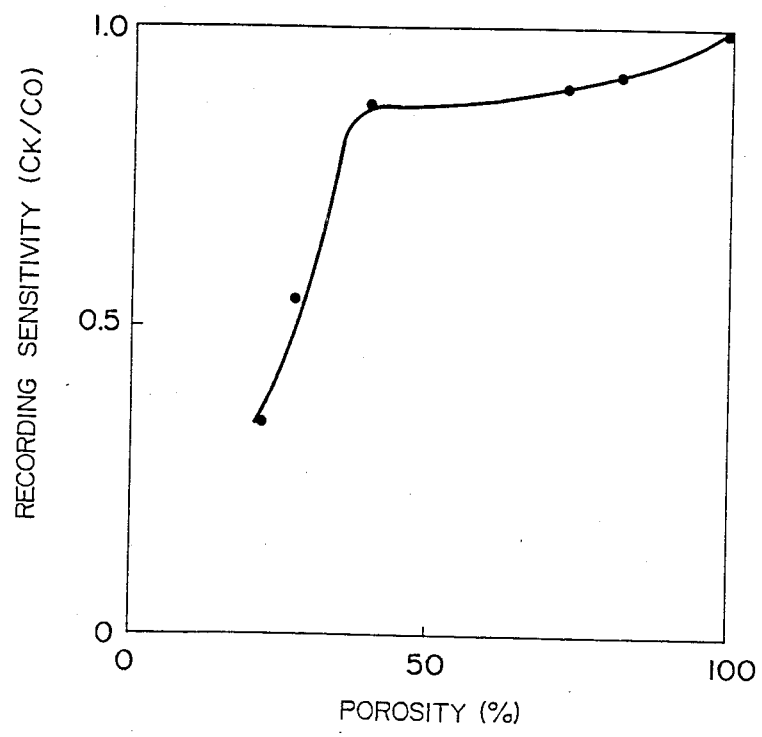
FIG. 2 is a graph showing the relationship between porosity and a recording sensitivity of a porous member used in the above embodiment.

FIG. 2 is a graph showing a relationship between a porosity and a recording sensitivity of the porous member, wherein the horizontal axis of the graph shows the porosity values and the vertical axis thereof shows the ratio of a recording sensitivity Ck to a recording sensititivy of Co of the time when the porosity is 100% (without a porous member) and data obtained when a laser beam having a film surface power of 11 mW is irradiated.

As is apparent from this graph, the recording sensitivity is abruptly lowered when the porosity is 40% or less, and therefore, it is obvious that a porous member having a porosity of 40% or more must be used. On the other hand, if the porosity is too large, the amount of air between the substrates is increased with a result that these substrates will be greatly deformed by changes in atmospheric conditions, and thus the desired objects cannot be obtained. Consequently, a porous member having a porosity of 40% to 73% is used.

A material which is wet resistant and has a low surface energy and a large tangent angle includes a polyethylene fluoride resin, a polyimide resin, polyvinyl alcohol and the like. When an organic pigment type material is used for the recording layer, a material which is wet resistant and has a low surface energy and a large tangent angle is preferably used, and this material can be used even if containing bubbles composed of closed cells. Independent bubbles which are not composed of closed cells are not preferable because the recording layer is liable to be damaged due to corrosion due to water or the like in the air.

The use of the porous member enables evaporated or sublimated materials discharged from the recording layer during the recording operation to be absorbed into the pores of the porous member. Further, since the pores are dispersed on the surface of the porous member at the high density, the molten or resolved recording layer is not prevented from contracting at the periphery of the portion where a spot is irradiated, contracted to surface tension, and thus the recording sensitivity is not lowered by any appreciable extent.

Therefore, the use of the porous member having the pores for absorbing a discharged gas, for example, enables a closely adhered and bonded structure to be applied, and since this structure seals the bonded surfaces, foreign substance such as water and the like, cannot be deposited on the recording layer, and thus a worsening of the quality of the layer is prevented.

Further, since an amount of air sealed between the two plate shaped members is reduced, the structure is less affected by atmospheric conditions than an optical data recording medium having an air sandwich structure, whereby the problems wherein the record reproducing property is lowered and the substrate is cracked or peeled due to warping can be eliminated.

In addition, the selection of a material such as a polyethylene fluoride resin, a polyimide resin, and polyvinyl alcohol, which is wet resistant (having a low surface energy and a large tangent angle) provides a low close adhesion force between the molten recording layer and the protective layer, whereby the molten recording layer can be shed and dispersed, and thus a satisfactory pit without residue can be formed to thereby improve the recording/reproducing property.

The protective layer is deposited on the recording layer by a spattering process, printing, coating or the like, to a thickness of 500–$10^4$ Å. The protective layer may be bridged or polymerized by a UV irradiation process or the like, using a bridging agent, after the layer is deposited. Sometimes an inorganic material may be partially used as the protective layer, and in this case, the surface of the inorganic material may be protected by being covered with an organic material or oxidized, to prevent a heat transfer from the recording layer.

The substrate may be composed of a transparent ceramic such as glass, or a transparent resin material such as polycarbonate (PC), polymethylmetacrylate (PMMA), polymethylpentene, epoxy or the like.

The recording material for the melting and diffusion system for forming the above recording layer can be arbitrarily selected from an organic pigment type recording material or a metallic recording material. The former organic pigment type recording material may include, for example, polymethine dye, anthraquinone dye, cyanine dye, phthalocyanine dye, xanthene dye, triphenylmethane dye, pyrylium dye, azulene dye, metals including azo dye and the like. The latter metallic recording material may include a metal material of Te, Pb, Se, In and the like or alloys of one or more thereof. Further, the metallic recording material may be of either an amorphous material or a crystal material.

The other materials and structures are not particularly restricted and any materials and structures which are applicable to an optical data recording medium for a melting and diffusion recording system may be suitably selected and used in accordance with the object for which they are to be used, so long as they do not hinder the realization of the objects of the present invention.

The present invention will be described with reference to the embodiments of the drawings, but is not restricted by these embodiments.

Figure 1:
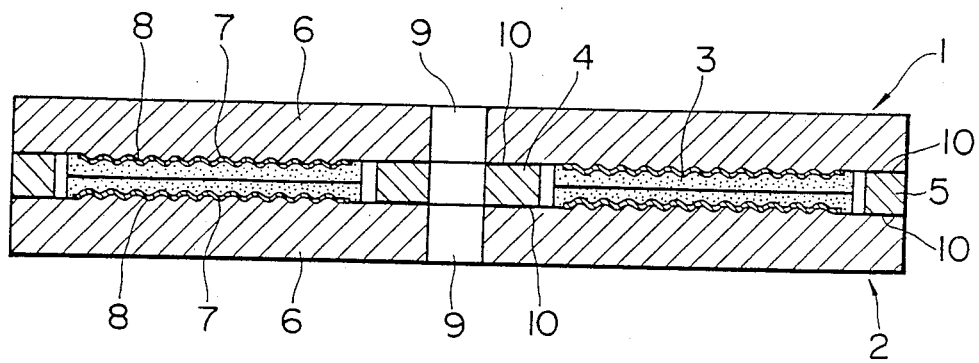
FIG. 1 is a cross sectional view of an optical data recording medium of a first embodiment of the present invention.

FIG. 1 is a cross sectional view of an optical data recording medium of an embodiment according to the present invention, wherein two disk shaped recording single-plates 1 and 2 are bonded through a protective layer 3 and spacers 4 and 5. The recording layers 8 made of a heat mode recording material are formed on signal pattern surfaces 7 of substrates 6 of the recording single-plates 1 and 2, respectively.

The substrate 6 is composed of a transparent resin material and formed into a circular shape having a penetrating hole 9 defined at the center thereof.

The signal pattern 7 comprises guide channels corresponding to tracking signals or prepit arrays corresponding to address signals and the like, and is formed on one surface of the substrate 6 in an irregular shape. The signal pattern 7 is formed as a spiral or concentric shape about the center axis of the above penetrating hole 9 at an intermediate region of the substrate, and not at the innermost and outermost peripheries thereof.

A means for forming the signal pattern 7, may be any known means selected depending on the material of the substrate 6, from an injection method, a 2P method (optically curing resin transfer method), and a mold pouring method.

The recording layer 8 is composed of a known heat mode recording material, and is formed on the signal pattern 7 of the substrate 6 except at the innermost and outermost peripheries thereof.

When an organic pigment type heat mode recording material is used as the recording material, a spin coating method is used for forming the recording layer 8: this method includes solving a suitably selected and desired organic pigment in a solvent, dropping the solved pigment on the rotating substrate, and forming a thin film thereon. When a low melting point type heat mode recording material is used as the recording material, a vacuum coating method such as a spattering method, a vapor-deposition method or the like is particularly suitable for forming the recording layer 8.

The protective layer 3 is integrally formed on the recording layer 8 as a film using a porous ethylene fluoride resin or an ethylene fluoride resin having bubbles composed only of closed cells.

The inner peripheral spacer 4 and the outer peripheral spacer 5 are formed in a ring shape having predetermined inside and outside diameters, using a metal or resin thin plate. The inner peripheral spacer 4 and outer peripheral spacer 5 are formed by cutting, stamping, punching or the like, and the thickness thereof is such that, when the two recording single-plates 1 and 2 are bonded together with the recording layers 8 facing inward, the protective layers 3 of both single-plates, composed of the porous members, are closely adhered and a strong pressure is not applied to the protective layers 3 composed of these porous members.

These inner and outer peripheral spacers 4 and 5 are bonded together to the substrates 6 through an adhesive 10.

An example of a method of fabricating the optical data recording medium relating to the above embodiment will be described below.

At first, the substrate 6 having one surface on which the signal pattern 7 is transferred is produced, and then the recording layer 8 and the protective layer 3 are sequentially formed on the signal pattern 7 of the substrate 6 to provide two recording single-plates 1 and 2.

In parallel with these processes, the inner peripheral spacer 4 and the outer peripheral spacer 5 are produced by a suitable method.

Next, an adhesive is applied to one surface of each of these inner peripheral spacer 4 and outer peripheral spacer 5 and they are bonded to the inner and outer peripheries of the recording single-plate 1.

Then, the adhesive is applied to the other surfaces of each of these inner peripheral spacer 4 and outer peripheral spacer 5, and then the recording single-plate 1 is confronted with the recording single-plate 2 with their recording layers facing inward and they are together with their center axes in alignment.

Since the optical data recording medium of the above embodiment has the bonded surfaces of the inner and outer peripheries sealed by the adhesive 10, foreign matter such as water and dust does not deposit on the recording layer 8 so that this medium has a life as long as a conventional optical data recording medium of a conventional sealed type air sandwich structure.

Since the protective layer 3 is interposed between the two recording single-plates 1 and 2, an amount of air sealed therebetween can be reduced so that the substrate is less deformed than the optical data recording medium of the sealed air sandwich structure. Then, such problems as the deterioration of a record reproducing property caused by the curve and deformation of the substrate and the cracking and peeling thereof can be solved.

The recording layer 8 formed by the organic pigment type heat mode recording material is changed in volume of about 20%–30% during writing, and thus less amount of gases are discharged in writing in comparison with a low melting point alloy type heat mode recording material. Therefore, when the porous member 3 having a suitable porosity is selected, all the gases discharged from the recording layer 8 can be absorbed in the porous layer 3.

Further, since the recording layer 8 formed by the organic pigment type heat mode recording material can record data by a difference in level of a reflecting surface and a photochromism phenomenon caused by a change in volume even if a perfect penetrating hole is not formed in writing which is required in the case of the low melting point alloy type heat mode recording material, a recording sensitivity is less lowered even if the formation of a hole is prevented to some extent by the interposition of the protective layer 3.

Figure 3:
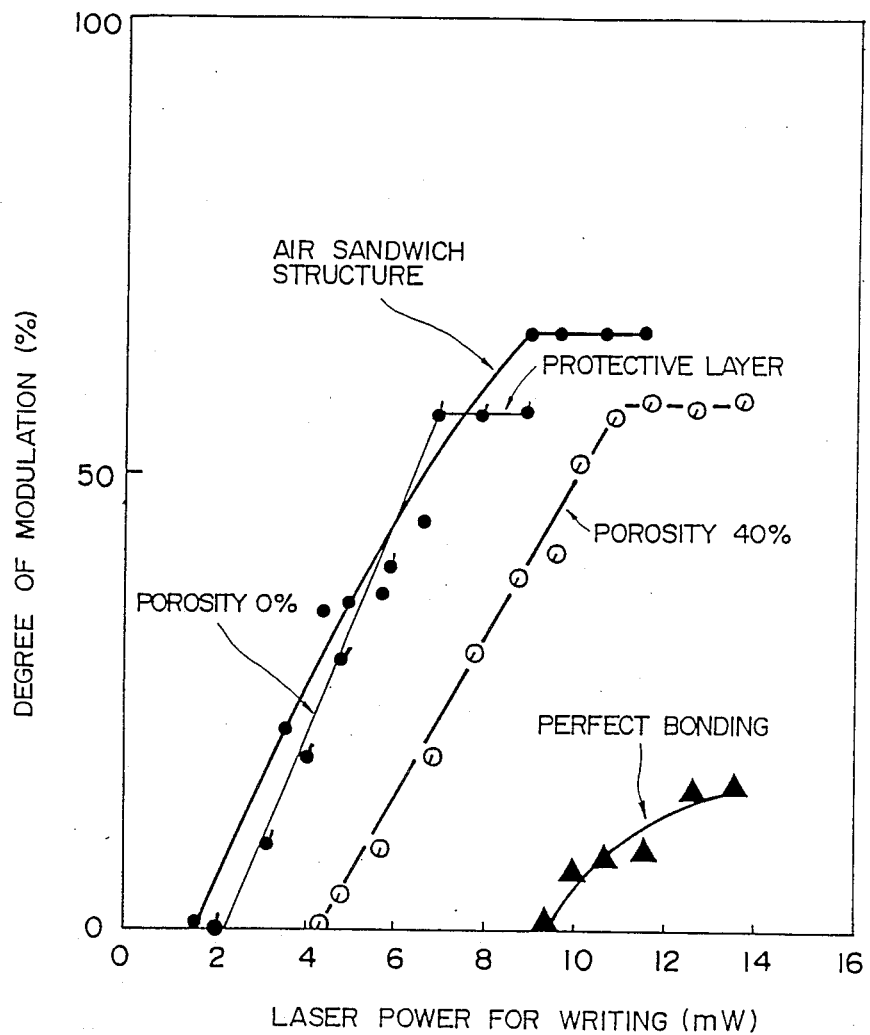
FIG. 3 is a graph showing the performance of the optical data recording medium of a first embodiment of this invention.

FIG. 3 shows a comparison of the recording sensitivity of a conventionally known optical data recording medium of a sealed type air sandwich structure with that of an optical data recording medium according to the present invention. The recording layers of both media are applied with a cyanine type pigment solved in an organic solvent by spinning, and in the case of the optical data recording medium according to the present invention a porous member composed of a porous ethylene fluoride resin is interposed and the comparison is made in the case that a non porous protective layer is layered on a pigment type of molten and dispersed recording layer. In addition, both media use a substrate composed of a PC formed by an injection molding.

In FIG. 3, a horizontal axis represents a laser power for writing (a power on a film surface) and a vertical axis represents a degree of modulation of the recording layer, wherein the degree of modulation indicates the sensitivity of the recording layer. Assuming that a reflecting rate before recording is A and that after recording is B, the degree of modulation is given by the following equation.

$$\text{degree of modulation} = 1 - (B/A)$$

As apparent from the graph, the optical data writing medium according to the present invention of the case that a porous material is used has a degree of modulation which is about 10% lower than that of the conventional data recording medium when the laser power for writing is 11 mW. This recording sensitivity is not a problem in practical use because a degree of modulation of 50% or more is still provided. On the other hand, when the recording layers are perfectly bonded to each other through an adhesive, the maximum degree of modulation is only about 15%, and thus it is found that this structure cannot be practically used.

It is possible for a medium to be recorded in the case that non porous layer is layered, similarly possible to the case of porous layer, by selection of a suitable recording material to be combined with said non porous layer.

As shown above, the interposition of the protective layers 3 between the recording layers 8 causes no problem in practical use.

Although the arrangement of a both side recording type data recording medium wherein two recording single-plates are bonded together is described in the above embodiment, the embodiment of the present invention is not limited to the above arrangement, and a reinforcing plate shaped member which has substantially the same shape and size as the above substrate and on which a signal pattern and a recording layer are not formed may be bonded in place of on of the recording single-plates.

Figure 4:
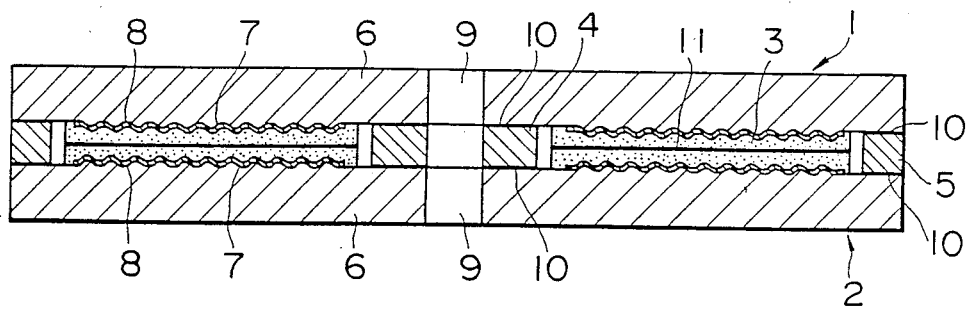
FIG. 4 is a cross sectional view of an optical data recording medium of a second embodiment.

Further, the above embodiment describes a case wherein the protecting layers are directly brought into contact, but as shown in FIG. 4, the contact surfaces of the protective layers ma be bonded through an adhesive 11.

Figure 5:
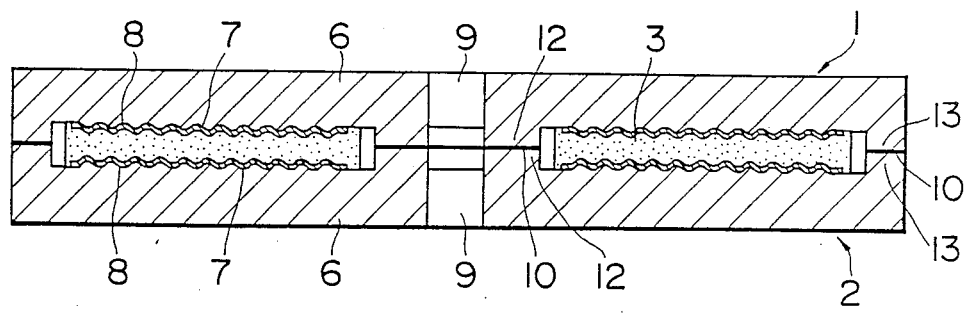
FIG. 5 is a cross sectional view of an optical data recording medium of a third embodiment.

In addition, the above embodiment describes the case wherein the two recording single-plates are bonded together through the spacers which are separately formed from the plates, but as shown in FIG. 5, when these substrates are composed of a resin, the inner peripheral spacer 12 and the outer peripheral spacer 13 may be integrally formed with the substrates 6.

Figure 6A:
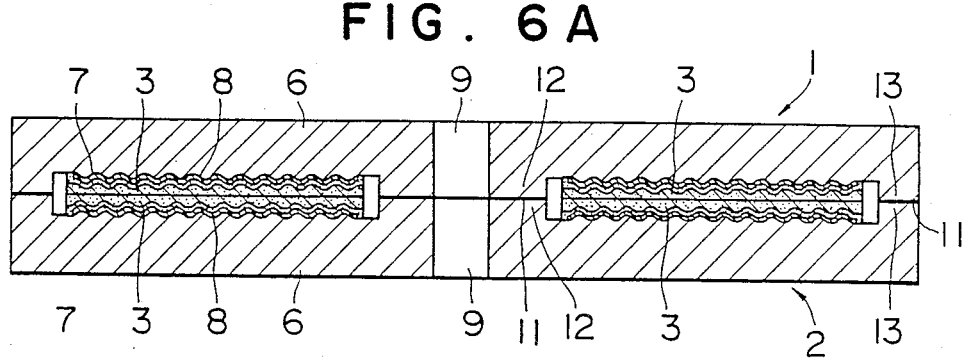
FIG. 6(A) is a cross sectional view of an optical data recording medium of a fourth embodiment according to the present invention.
Figure 6B:
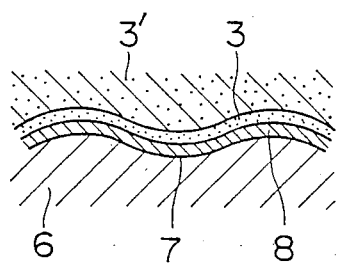
FIG. 6(B) is an enlarged cross sectional view of the main part of FIG. 6(A).

FIGS. 6(A) and 6(B) are cross sectional views of an optical data recording medium of a fourth embodiment according to the present invention, wherein a porous protective layer 3' is further formed on the above protective layer 3 which is liable to be wetted. This porous protective layer 3' may be arbitrarily selected from porous materials such as an organic material (e.g., a polyethylene fluoride resin or the like) and an inorganic material (e.g., alumina, silica or the like), and this porous material is deposited and formed by a suitable means such as printing (e.g., a roller coating) or coating (a spray coating) or the like. In some cases, it is possible that an adhesive is applied to the porous material itself and make it a bonding layer. The thickness of the porous protective layer 3', which depends on the thickness of the protective layer 3, is about 100–400 μm, and the surface thereof is set at substantially the same level as the surfaces of the spacers 12 and 13. Further, although this protective layer 3' composed of the porous member includes an independent bubble type and a continuous bubble type, the former is preferable from the view point of mechanical strength and the like.

In this embodiment, a charging and sealed type optical data recording medium shown in FIG. 6 is completed by the processes that the recording single-plates 1 and 2, each of which is composed of the substrate 6 having the recording layer 8, the protective layer 3 and the porous protective layer 3' deposited thereon in this order, are assembled in such a manner that the porous protective layers 3' are held into abutment, and the spacers 12 and the 13 are bonded together and fixed through the adhesive 7 with the central axes of the recording single-plates 1 and 2 being in alignment.

In this arrangement, the same effect as those of the above embodiments can be expected. In addition, the porous protective layer 3' may be replaced with the adhesive layer.

Figure 7:
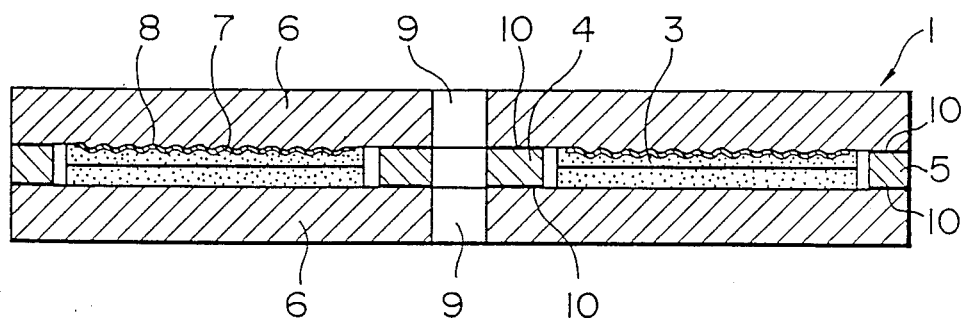
Figure 8:
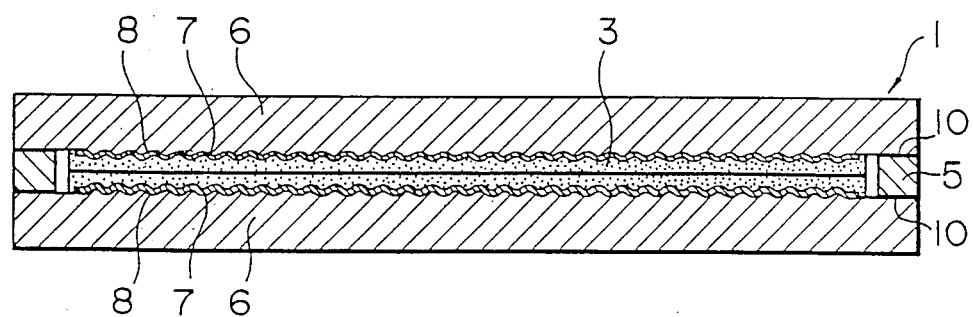

Although the arrangement of a both side recording type data recording medium wherein two recording single-plates are bonded is described in the above respective embodiments, the present invention is not limited to it, for example, a reinforcing plate shaped member which has substantially the same shape and size as the above substrate and on which a signal pattern and a recording layer are not formed may be bonded in place of one of the recording single-plates as shown in FIG. 7. In addition, although a disk type optical data recording medium is described as an examples in the above embodiments, the present invention is applicable to a medium of all the other known modes such as a card type optical data recording medium, for example, of a cross sectional structure as shown in FIG. 8.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An optical data recording medium comprising:
   first transparent substrate having a first recording layer formed of a melting and diffusion type recording mode material;
   second transparent plate shaped substrate, with or without a second recording layer, integrally bonded to said first transparent substrate with said first recording layer facing inward; and
   a first porous protective layer composed of a porous material which is wet resistant and has a low surface energy and large tangent angle, interposed between said first recording layer of said first transparent substrate and said second recording layer or surface of said second transparent substrate.

2. An optical data recording medium according to claim 1, wherein said porous layer has an average pore diameter of 0.03 μm–0.30 μm, a porosity of 40%–73%, and a thickness of 100 μm–150 μm.

3. An optical data recording medium according to claim 1, wherein said porous material is composed of a porous ethylene fluoride resin.

4. An optical data recording medium according to claim 1, wherein said first porous layer is bonded to said second recording layer or said surface of said second transparent substrate through an adhesive.

5. An optical data recording medium according to 1, wherein a second protective layer of a porous material is superimposed on said wet resistant porous material of said first porous protective layer.

6. An optical data recording medium according to claim 1, wherein a second protective layer of a porous material is interposed between said first recording layer and said wet resistant porous material of said first porous protective layer.

7. An optical data recording medium according to claim 1, wherein said wet resistant porous material having a low surface energy and a large tangent angle is selected from at least one of a polyethylene fluoride resin, a polyimide resin, and an inorganic material coated by either of these materials.

8. An optical data recording medium according to claim 1, wherein said wet resistant material having a low surface energy and a large tangent angle is bonded to the surface of said another plate shaped member through an adhesive.

9. An optical data recording medium according to claim 1, wherein said second plate shaped substrate comprises a recording single-plate having a second porous protective layer comprised of a porous material which is wet resistant and has a low surface energy and a large tangent angle, on a recording layer thereof.

10. An optical data recording medium according to claim 5, wherein said second porous protective layer is composed of a wet resistant material having a low surface energy and a large tangent angle.

11. An optical data recording medium according to claim 5, wherein said porous material is composed of an inorganic material.

12. An optical data recording medium according to claim 6 wherein said second porous protective layer is composed of a wet resistant material having a low surface energy and a large tangent angle.

13. An optical data recording medium according to claim 7, wherein said porous material comprises a polyethylene fluoride resin containing independent bubbles.

* * * * *